(12) United States Patent
Nagayasu (10) Patent No.: US 8,665,514 B2
(45) Date of Patent: Mar. 4, 2014

(54) MULTI-CORE OPTICAL AMPLIFICATION FIBER WOUND WITH DECREASING RADIUS OF CURVATURE

(75) Inventor: Doukei Nagayasu, Hyogo (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 13/144,939

(22) PCT Filed: Mar. 5, 2010

(86) PCT No.: PCT/JP2010/001540
§ 371 (c)(1),
(2), (4) Date: Jul. 18, 2011

(87) PCT Pub. No.: WO2010/103764
PCT Pub. Date: Sep. 16, 2010

(65) Prior Publication Data
US 2011/0310469 A1 Dec. 22, 2011

(30) Foreign Application Priority Data
Mar. 11, 2009 (JP) .................................. 2009-057701

(51) Int. Cl.
*H04B 10/17* (2011.01)
*H01S 3/00* (2006.01)
*G02B 6/036* (2006.01)

(52) U.S. Cl.
USPC .............................. 359/341.3; 385/126; 372/6

(58) Field of Classification Search
USPC .................. 385/126; 359/341.1, 341.3; 372/6
See application file for complete search history.

(56) References Cited

U.S. PATENT DOCUMENTS

| 4,546,476 A | 10/1985 | Shaw et al. |
| 4,938,561 A | 7/1990 | Grasso et al. |
| 6,167,181 A | 12/2000 | Fukaishi |
| 6,459,068 B1 | 10/2002 | Yamaura et al. |
| 6,533,883 B1 | 3/2003 | Tanaka et al. |
| 6,683,892 B1 | 1/2004 | Yamaura et al. |
| 7,197,219 B2 * | 3/2007 | Provost et al. ................ 385/123 |
| 7,283,293 B2 * | 10/2007 | Nagayasu .................. 359/341.1 |
| 7,587,110 B2 * | 9/2009 | Singh et al. .................... 385/126 |
| 2002/0021489 A1 | 2/2002 | Willets et al. |
| 2002/0146226 A1 * | 10/2002 | Davis et al. .................... 385/126 |

(Continued)

FOREIGN PATENT DOCUMENTS

| EP | 1137131 A1 * | 9/2001 | ............. H01S 3/102 |
| EP | 1 731 936 A1 | 12/2006 | |

(Continued)

OTHER PUBLICATIONS

Lu, "Gain-flattened L-band Erbium-doped fibre amplifier using dual-core fibre", Optical Fiber Communication Conference 2002, p. 631-633, (2002).*

*Primary Examiner* — Eric Bolda
(74) *Attorney, Agent, or Firm* — RatnerPrestia (57) ABSTRACT

A fiber laser apparatus includes an optical amplification fiber with a multi-core structure composed of a first waveguide that pumping light enters and that transmits the pumping light; a second waveguide composed of a core containing a laser medium and for generating laser, and a clad for transmitting pumping light; and a third waveguide containing the first waveguide and the second waveguide. The optical amplification fiber is wound while the curvature radius is being changed to provide a small-size, high-power fiber laser apparatus.

20 Claims, 7 Drawing Sheets

(56) References Cited

U.S. PATENT DOCUMENTS

| | | |
|---|---|---|
| 2002/0172236 A1 | 11/2002 | Sekiguchi et al. |
| 2003/0059195 A1* | 3/2003 | Brennan et al. ............... 385/146 |
| 2005/0041702 A1* | 2/2005 | Fermann et al. ............... 372/25 |
| 2005/0254762 A1* | 11/2005 | Provost et al. ............... 385/123 |
| 2006/0245704 A1 | 11/2006 | Nagayasu |
| 2008/0025363 A1 | 1/2008 | Yla-jarkko et al. |
| 2009/0324242 A1* | 12/2009 | Imamura ....................... 398/142 |
| 2011/0235983 A1* | 9/2011 | Hayashi et al. ............... 385/100 |

FOREIGN PATENT DOCUMENTS

| | | |
|---|---|---|
| EP | 10 75 0522 | 10/2012 |
| FR | 2 773 419 A1 | 7/1999 |
| JP | 56-144416 A | 11/1981 |
| JP | 56-144416 A | 11/1981 |
| JP | 59-114883 A | 3/1984 |
| JP | 01-203938 A | 8/1989 |
| JP | 5-297228 A | 11/1993 |
| JP | 11-284255 A | 10/1999 |
| JP | 2001-36170 A | 2/2001 |
| JP | 2001-036170 A | 2/2001 |
| JP | 2001-144350 A | 5/2001 |
| JP | 2002-094152 A | 3/2002 |
| JP | 2005-294675 A | 10/2005 |
| JP | 2006-114769 A | 4/2006 |
| JP | 2006-114769 A | 4/2006 |
| JP | 2008-511148 A | 4/2008 |
| WO | WO 01/91252 A2 | 11/2001 |
| WO | WO 2006/021609 A1 | 3/2006 |

* cited by examiner

Laser output

Laser output

MULTI-CORE OPTICAL AMPLIFICATION FIBER WOUND WITH DECREASING RADIUS OF CURVATURE

This application is a U.S. NATIONAL PHASE APPLICATION OF PCT INTERNATIONAL APPLICATION No. PCT/JP2010/001540.

TECHNICAL FIELD

The present invention relates to fiber laser apparatus including fiber containing a laser medium and to an optical amplification method.

BACKGROUND ART

In recent years, laser machining has become widely used as a machining method in the material processing field. For example, laser welding and laser cutting have been recognized as providing higher machining quality than the other methods. Under the circumstances, the market is requesting higher quality and faster machining. Specifically, the market is asking for laser oscillators and laser amplifiers that generate and emit single-mode laser with what is called high beam quality (i.e. high power, high efficiency, and high optical condensability).

To achieve high power, a conventional laser oscillator has a multi-core (multiple waveguides) structure in which fiber containing a laser medium and fiber for transmitting pumping light are positioned close to each other, and has a material with a given refractive index filling the space between the fiber (refer to patent literatures 1 and 2, for instance).

It is known that fiber wound at a certain curvature radius causes a bending loss, which allows the mode of transmitted light to be selected (refer to patent literature 3, for instance).

Meanwhile, the following method is known. That is, single-core (single waveguide) fiber is unified while the wrap-around curvature radius is being changed, and is irradiated with pumping light from the outside (patent literature 4, for instance).

Figure 7A:
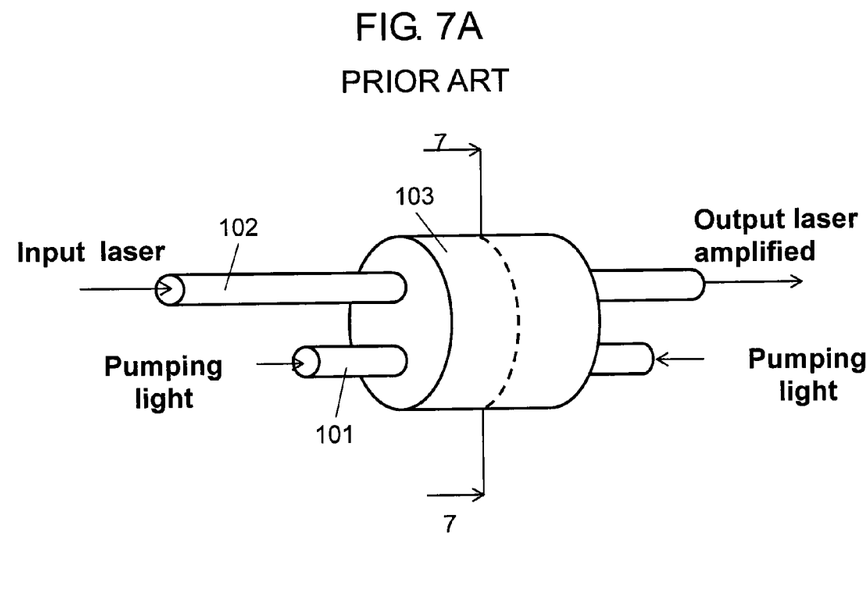
FIG. 7A is a block diagram of conventional fiber laser apparatus.
Figure 7B:
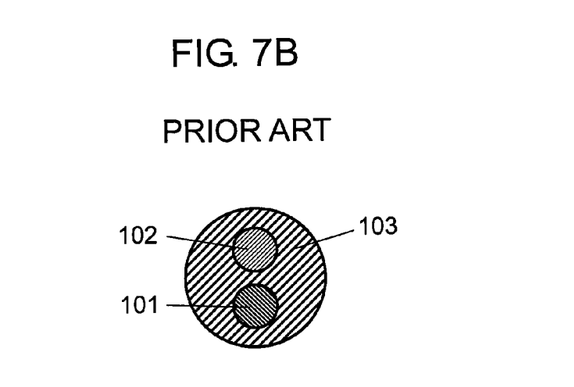
FIG. 7B is a sectional view taken along the line 7B-7B in FIG. 7A.

FIG. 7A is a block diagram of the above-described conventional fiber laser apparatus. FIG. 7B is a sectional view taken along the line 7B-7B in FIG. 7A. In FIGS. 7A and 7B, pumping light transmission fiber 101 for transmitting pumping light and laser amplification fiber 102 containing a laser medium are placed close to each other. Bonding fiber 103 contains pumping light transmission fiber 101 and laser amplification fiber 102 and is filled with a material having a given refractive index.

One end of laser amplification fiber 102 has a final-stage mirror (not shown) for reflecting laser, and the other end has an output mirror (not shown) for extracting part of laser and reflecting the rest. The mirrors generate laser with multiplex feedback amplification.

A description is made of operation of the conventional laser oscillator configured as above. Pumping light propagating through pumping light transmission fiber 101 enters laser amplification fiber 102 through bonding fiber 103 to excite the laser medium. The excitation and multiplex feedback amplification cause laser to be generated and to be emitted from the output mirror.

To generate higher power, conventional fiber laser apparatus uses bonding fiber 103 with a multi-core structure, where bonding fiber 103 is filled with a resin filler. This resin imposes limitations on high-power light entering laser amplification fiber 102 from pumping light transmission fiber 101. Accordingly, to increase such high-power light, the fiber length needs to be increased, which prevents small-size, high-power fiber laser apparatus to be provided.

PRIOR ART DOCUMENTS

Patent Literature

[Patent literature 1] Japanese Patent Unexamined Publication No. S59-114883
[Patent literature 2] U.S. Pat. No. 4,938,561 Description
[Patent literature 3] Japanese Patent Unexamined Publication No. H01-203938
[Patent literature 4] Japanese Patent Unexamined Publication No. 2001-36170

SUMMARY OF THE INVENTION

The present invention provides small-size, high-power fiber laser apparatus and an optical amplification method. The configuration of the present invention includes optical amplification fiber with a multi-core structure composed of a first waveguide that pumping light enters and that transmits the pumping light; a second waveguide composed of a core containing a laser medium and for generating laser, and a clad for transmitting the pumping light; and a third waveguide containing the first and second waveguides. The optical amplification fiber is wound while the curvature radius is being changed, which provides small-size, high-power fiber laser apparatus and an optical amplification method.

DETAILED DESCRIPTION OF PREFERRED EMBODIMENTS

Hereinafter, a description is made of some embodiments of the present invention with reference to the related drawings.

First Exemplary Embodiment

Figure 1A:
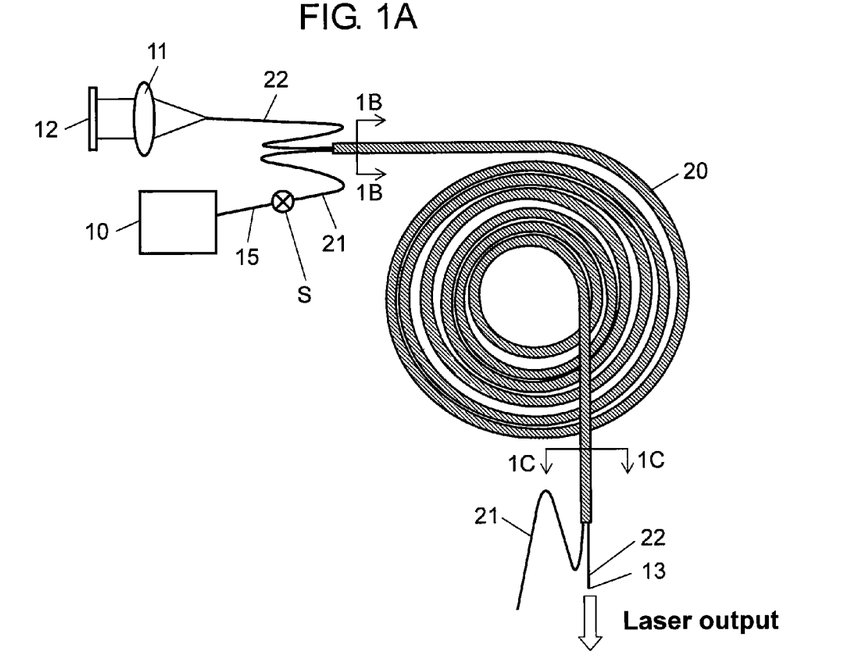
FIG. 1A is a block diagram of fiber laser apparatus according to the first exemplary embodiment of the present invention.
Figure 1B:
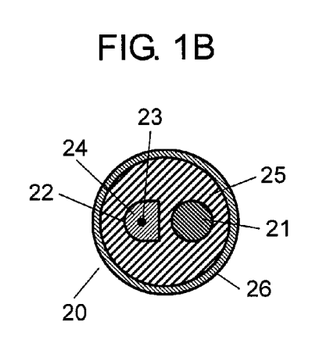
FIG. 1B is a sectional view taken along the line 1B-1B in FIG. 1A.
Figure 1C:
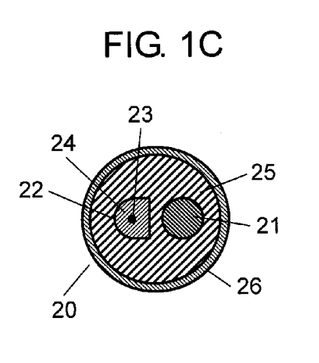
FIG. 1C is a sectional view taken along the line 1C-1C in FIG. 1A.
Figure 1D:
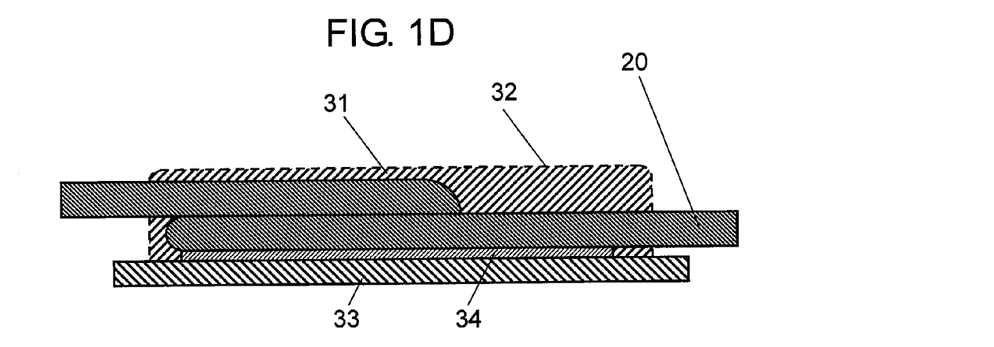
FIG. 1D is a side view of the substantial part of the first exemplary embodiment.

FIG. 1A is a block diagram of fiber laser apparatus according to the embodiment. FIG. 1B is a sectional view taken along the line 1B-1B in FIG. 1A. FIG. 1C is a sectional view taken along the line 1C-1C in FIG. 1A. FIG. 1D is a side view of the substantial part of the embodiment. FIGS. 1A through 1C show pig-tail fiber laser apparatus including semiconductor laser 10 as an pumping light source and semiconductor laser transmission fiber 15 for transmitting the laser. The wavelength is such that it excites a laser medium. This embodiment uses ytterbium (rare earth) as a laser medium, and thus the wavelength is desirably 915 nanometers that stably excites ytterbium.

Lens 11 prevents laser generated from diverging; desirably converts it into parallel light; and introduces the light to final-stage mirror 12 made of a mirror with a high reflectiveindex. Lens 11 and final-stage mirror 12 constitute part of a feedback system for laser.

Optical amplification fiber 20 partially contains a laser medium. The cross-section shape of the fiber is the same along the direction of laser emission (i.e. the optical axis) except at both ends.

Optical amplification fiber 20 has a multi-core (multiple waveguides) structure composed of first waveguide 21 that pumping light enters and that transmits the pumping light; second waveguide 22 composed of core 23 containing a laser medium and for generating laser, and clad 24 for transmitting pumping light; and third waveguide 25 containing first waveguide 21 and second waveguide 22.

Minutely, first waveguide 21 is an exciting waveguide with a diameter of 125 micrometers made of quartz glass that pumping light enters and that transmits the pumping light. Second waveguide 22 contains quartz glass as its base material; has a D-shaped cross section; and absorbs pumping light to generate laser. Third waveguide 25 efficiently introduces pumping light from first waveguide 21 to second waveguide 22 and is filled with a filler (desirably UV hardening acrylic adhesive) with its refractive index adjusted so as to confine the pumping light into second waveguide 22. Further in this embodiment, third waveguide 25 has outer layer 26 made of a resin containing the refractive index conditioning filler for enhancing efficiency of confining pumping light, on the outer surface of third waveguide 25.

The length of optical amplification fiber 20 varies depending on the concentration of ytterbium as a laser medium contained in core 23, the absorption coefficient of pumping light (a wavelength of 915 nanometers) determined by such as the cross-section shapes of first waveguide 21, second waveguide 22, and third waveguide 25, and other factors. The length is usually approximately 20 meters.

Second waveguide 22, containing ytterbium as a laser medium inside thereof, is composed of core 23 with a diameter of 30 micrometers transmitting multimode light; and clad 24 with a representative diameter of 125 micrometers containing quartz glass as its base material confining laser generated by excitation. Assumption is made that the refractive index of first waveguide 21 is n1; the refractive index of clad 24 of second waveguide 22 is n2; the refractive index of core 23 is n3; the refractive index of third waveguide 25 is n4; and the refractive index of outer layer 26 is n5, then configuration is made so as to satisfy n5<n1<n4<n2<n3 for light with an excitation wavelength of 915 nanometers.

At both ends of above-described optical amplification fiber 20, first waveguide 21 and second waveguide 22 are exposed from third waveguide 25 except part of it. One end of optical amplification fiber 20 at semiconductor laser 10 is a reflection end from which laser is not extracted as optical output; the other end is an emission end from which laser is extracted as optical output.

The most part of optical amplification fiber 20, except its both ends, desirably part one meter or more distant from each end face, is wound at a desired, inconstant curvature radius. The curvature radius gradually decreases from the reflection end toward the emission end, and the part is spirally wound. In other words, the curvature radius decreases as pumping light propagates.

A desirable minimum curvature radius is such that only single-mode laser can be transmitted. As shown in FIG. 1D, part 31 spirally wound is mostly on the same plane. At least the most part of part 31 spirally wound is fixed with heat dissipating agent 32, desirably with heat transferring silicone putty, and is further placed on cooling board 33 through heat dissipating putty 34. Hence, part 31 spirally wound is efficiently cooled.

Further, at the reflection end of optical amplification fiber 20, first waveguide 21 is spliced to semiconductor laser transmission fiber 15 by fusion bonding (hereinafter, such a position is indicated by S in each figure). This structure transmits pumping light with a wavelength of 915 nanometers through the inside of optical amplification fiber 20. The end face of second waveguide 22 is reflection-free terminated and directly faces the feedback system composed of lens 11 and final-stage mirror 12.

Meanwhile, at the emission end of optical amplification fiber 20, the end face of first waveguide 21 is reflection-free terminated, desirably ground with an incline of 8 degrees with respect to a surface perpendicular to the optical axis. The end face of second waveguide 22 is cleaved at the emission end. Fresnel reflection at the cleaved part, together with the feedback system composed of lens 11 and final-stage mirror 12 placed at the reflection end, constitutes a resonator for feedbacking laser.

A description is made of operation of fiber laser apparatus configured as above according to the embodiment. First, semiconductor laser 10 as an excitation source is driven by a typical power supply, cooler, and controller (all not shown) to emit laser with a wavelength of 915 nanometers as light for exciting ytterbium through semiconductor laser transmission fiber 15.

Semiconductor laser transmission fiber 15 is spliced to first waveguide 21 of optical amplification fiber 20, and laser emitted is introduced to first waveguide 21 of optical amplification fiber 20. This laser has an exciting wavelength of ytterbium (referred to as pumping light hereinafter).

In comparison of refractive index n1 of first waveguide 21 to refractive index n4 of third waveguide 25 enclosing first waveguide 21, n1<n4 is satisfied as defined before, and thus as pumping light propagates through first waveguide 21, the light efficiently leaks out into third waveguide 25.

The pumping light leaks out into third waveguide 25 while propagating through first waveguide 21 at a ratio determined by the refractive index, and by the curvature radius of first waveguide 21 and third waveguide 25. In other words, the mode of light transmittable by first waveguide 21 is determined depending on the curvature radius of optical amplification fiber 20, which determines the ratio of pumping light leaking out from first waveguide 21 to third waveguide 25.

This embodiment has a structure such that the curvature radius decreases from the reflection end toward the emission end. As a result, light ceases to propagate through first waveguide 21 from the reflection end toward the emission end, sequentially from a higher-order mode to a lower, to leak out into third waveguide 25.

Light ceases to propagate through first waveguide 21 as the curvature radius decreases from the reflection end toward the emission end, sequentially from a higher-order mode, to leak out into third waveguide 25.

That is to say, changing the curvature radius from the reflection end toward the emission end prevents high-power pumping light from passing through a small area of a filler filling third waveguide 25 at one time, but allows high-power pumping light to pass through a wide area over the entire lengthwise direction of optical amplification fiber 20. Accordingly, the volume of the filler through which pumping light passes increases, which decreases the output power of pumping light passing through a unit volume of the filler.

In comparison of refractive index n5 of outer layer 26 to refractive index n4 of third waveguide 25, n5<n4 is satisfied, and thus pumping light that has leaked out into third waveguide 25 is confined into third waveguide 25 and propagates through the inside of third waveguide 25 while multiply reflecting. In comparison of refractive index n2 of clad 24 of second waveguide 22 to refractive index n4 of third waveguide 25, n2>n4 is satisfied, and thus part of pumping light propagating through the inside of third waveguide 25 enters clad 24; is confined into second waveguide 22; and propagates through the inside of second waveguide 22 while multiply reflecting.

In comparison of refractive index n3 of core 23 to refractive index n2 of clad 24 of second waveguide 22, n3>n2 is satisfied, and thus part of pumping light propagating through the inside of second waveguide 22 enters core 23. On this occasion, the cross section of clad 24 of second waveguide 22 is D-shaped, and thus all the light is absorbed into core 23 while repeating multiplex reflection in clad 24 to excite ytterbium as a laser medium.

To increase laser efficiency, it is generally important not to decrease the efficiency of absorbing light for exciting a rare-earth element. As such a method, a D-shaped pump guide cross section for example is often used to disturb a skew component of pumping light. Thus in this embodiment, the cross section of clad 24 of second waveguide 22 is D-shaped; however, the present invention is not limit to this shape, but a symmetric shape such as a circular cross section suitable for bonding with pumping light may be used.

Specifically, pumping light that has entered one end of first waveguide 21 propagates through the inside of second waveguide 22 while attenuating in the above-described absorption process, and is absorbed into ytterbium in core 23 in due time to excite ytterbium. Light generated by the excitation undergoes multiplex amplification feedback by the optical resonator composed of core 23 for transmitting multimode light; and final-stage mirror 12 and output mirror 13 placed at both ends of core 23. The light then undergoes mode selection by wrapping around of optical amplification fiber 20. This generates single-mode laser with a wavelength of 1,085 nanometers and is emitted as laser output from output mirror 13 of core 23.

In this embodiment, one first waveguide is provided for constituting optical amplification fiber 20 and for transmitting pumping light; however, two or more waveguides may be used.

As described above, the configuration of the present invention includes optical amplification fiber 20 with a multi-core structure containing first waveguide 21 for transmitting pumping light and second waveguide 22 including core 23 for transmitting multimode light so that pumping light can enter core 23. Optical amplification fiber 20 is spirally wound so that the curvature radius decreases from the reflection end toward the emission end, which allows providing fiber laser apparatus that emits laser with high beam quality.

Second Exemplary Embodiment

Figure 2:
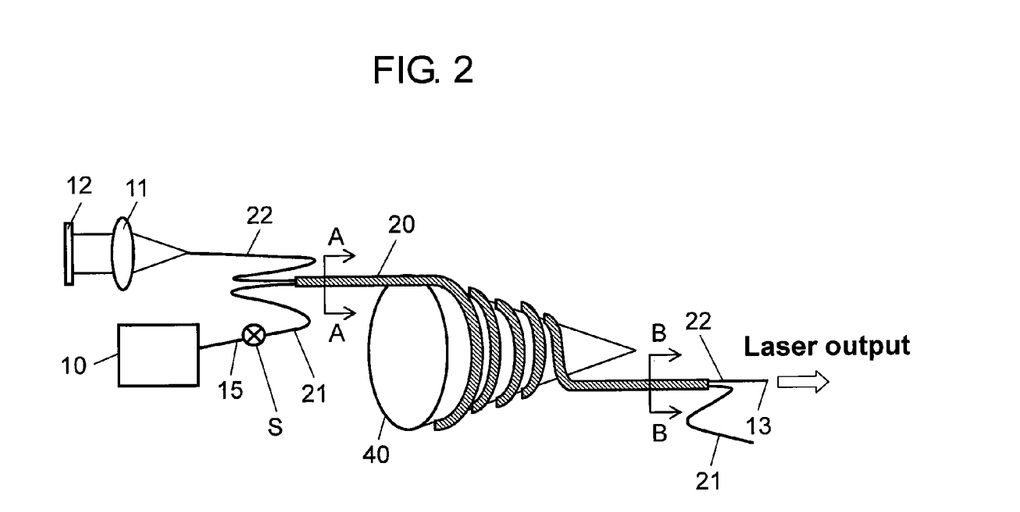
FIG. 2 is a block diagram of fiber laser apparatus according to the second exemplary embodiment of the present invention.

In this embodiment, a component the same as that in the first embodiment is given the same reference mark to omit its detailed description. FIG. 2 is a block diagram of fiber laser apparatus according to the second embodiment of the present invention. This embodiment is different from the first embodiment in that optical amplification fiber 20 is retained spirally at a desired curvature radius and in that cooling cone 40 water-cooled by a cooling-water duct (not shown) inside thereof is provided. Optical amplification fiber 20 wraps around cooling cone 40 so that the reflection end is positioned close to the bottom surface of cooling cone 40. Optical amplification fiber 20 wraps around cooling cone 40 spirally toward the top of the cone to retain and cool the fiber.

A description is made of operation of fiber laser apparatus configured as above. First, semiconductor laser 10 as an excitation source is driven by a typical power supply, cooler, and controller (all not shown) to emit laser with a wavelength of 915 nanometers as light for exciting ytterbium through semiconductor laser transmission fiber 15.

Semiconductor laser transmission fiber 15 is spliced to first waveguide 21 of optical amplification fiber 20, and laser emitted is introduced to first waveguide 21 of optical amplification fiber 20. This laser is light for exciting ytterbium.

In comparison of refractive index n1 of first waveguide 21 to refractive index n4 of third waveguide 25 enclosing first waveguide 21, n1<n4 is satisfied as defined in the first embodiment, and thus as pumping light propagates through first waveguide 21, the light leaks out into third waveguide 25.

The pumping light leaks out into third waveguide 25 while propagating through first waveguide 21 at a ratio determined by the curvature radius of first waveguide 21 and third waveguide 25. In other words, the mode of light transmittable by first waveguide 21 is determined by the curvature radius of optical amplification fiber 20. Light in an untransmittable mode leaks out into third waveguide 25.

This embodiment has a structure such that the curvature radius decreases from the reflection end toward the emission end. As a result, light ceases to propagate through first waveguide 21 from the reflection end toward the emission end, sequentially from a higher-order mode to a lower, to leak out into third waveguide 25.

The curvature radius is decreased spirally from the reflection end toward the emission end, which allows the curvature radius to be changed more gently than the first embodiment, where the fiber is spirally disposed on the same plane. Light in a higher-order mode cannot be transmitted through first waveguide 21 as the curvature radius decreases, and leaks out into third waveguide 25.

That is to say, changing the curvature radius from the reflection end toward the emission end prevents pumping light from passing through a small area of a filler filling third waveguide 25 at one time, but allows high-power pumping light to pass through a wide area over the entire lengthwise direction of optical amplification fiber 20. Heat generated on this occasion is cooled by cooling cone 40.

In comparison of refractive index n5 of outer layer 26 to refractive index n4 of third waveguide 25, n5<n4 is satisfied, and thus pumping light that has leaked out into third waveguide 25 is confined into third waveguide 25 and propagates through the inside of third waveguide 25 while multiply reflecting.

In comparison of refractive index n2 of clad 24 of second waveguide 22 to refractive index n4 of third waveguide 25, n2>n4 is satisfied, and thus part of pumping light propagating through the inside of third waveguide 25 enters clad 24; is confined into second waveguide 22; and propagates through the inside of second waveguide 22 while multiply reflecting.

In comparison of refractive index n3 of core 23 to refractive index n2 of clad 24 of second waveguide 22, n3>n2 is satisfied, and thus part of pumping light propagating through the inside of second waveguide 22 enters core 23. On this occasion, the cross section of clad 24 of second waveguide 22 is D-shaped, and thus all the light is absorbed into core 23 while repeating multiplex reflection in clad 24 to excite ytterbium as a laser medium.

Specifically, pumping light that has entered one end of first waveguide 21 propagates through the inside of second waveguide 22 while attenuating in the above-described absorption process, and is absorbed into ytterbium in core 23 in due time to excite ytterbium. Light generated by the excitation undergoes multiplex amplification feedback by the optical resonator composed of core 23 for transmitting multimode light; and final-stage mirror 12 and output mirror 13 placed at both ends of core 23. The light then undergoes mode selection by wrapping around of optical amplification fiber 20. This generates single-mode laser with a wavelength of 1,085 nanometers and is emitted as laser output from output mirror 13 of core 23.

As described above, the configuration of this embodiment includes optical amplification fiber 20 containing first waveguide 21 for transmitting pumping light and second waveguide 22 including core 23 for transmitting multimode light so that pumping light can enter core 23. Optical amplification fiber 20 is spirally wound around cone-shaped cooling cone 40 so that the reflection end is positioned close to the bottom surface of cooling cone 40. This allows providing fiber laser apparatus that emits laser with high power and high beam quality. In this embodiment, cooling cone 40 is cone-shaped; however, it may be truncated-cone-shaped.

Third Exemplary Embodiment

Figure 3A:
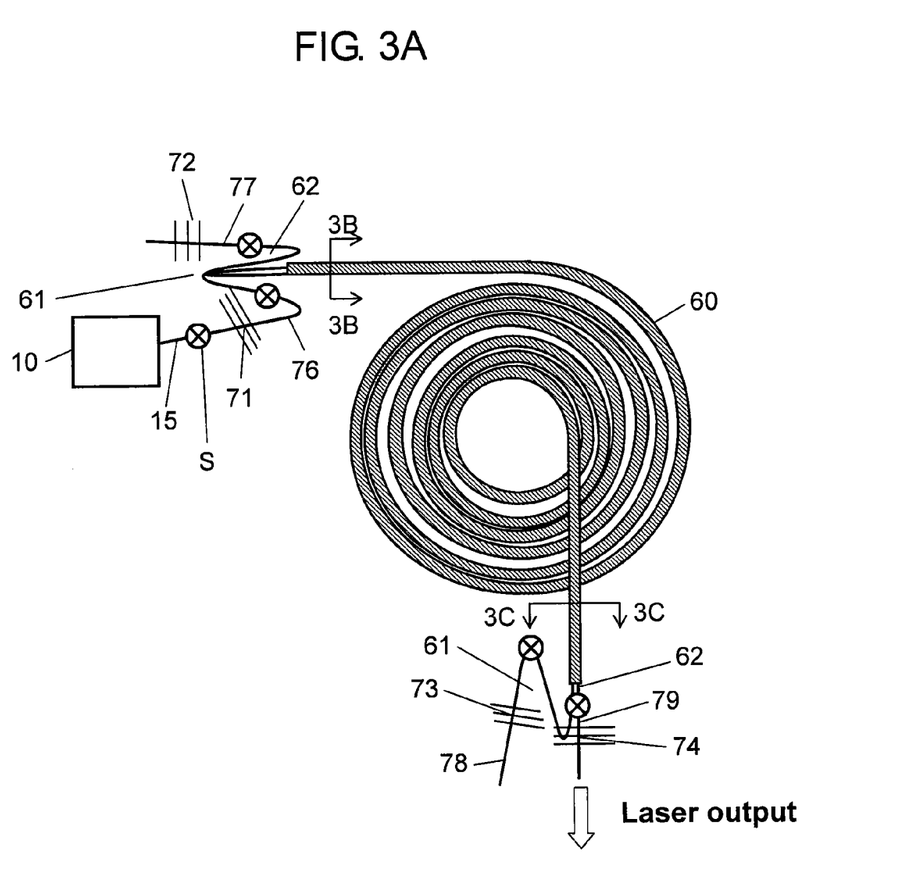
FIG. 3A is a block diagram of fiber laser apparatus according to the third exemplary embodiment of the present invention.
Figure 3B:
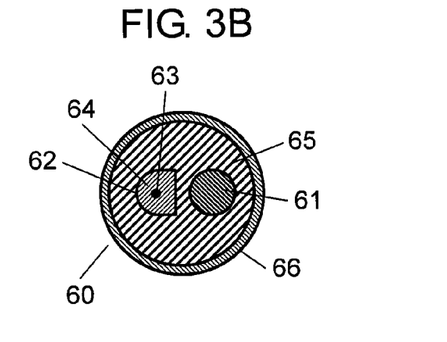
FIG. 3B is a sectional view taken along the line 3B-3B in FIG. 3A.
Figure 3C:
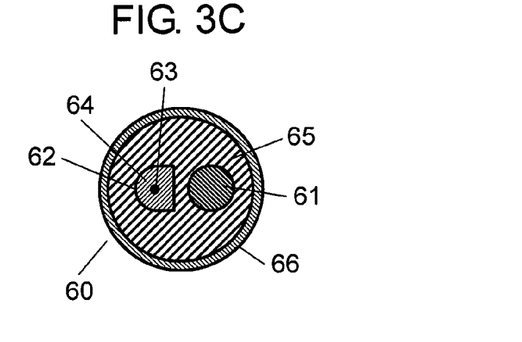
FIG. 3C is a sectional view taken along the line 3C-3C in FIG. 3A.

In this embodiment, a component the same as that in the first embodiment is given the same reference mark to omit its detailed description. FIG. 3A is a block diagram of fiber laser apparatus according to the embodiment. FIG. 3B is a sectional view taken along the line 3B-3B in FIG. 3A; FIG. 3C is a sectional view taken along the line 3C-3C.

In this embodiment, optical amplification fiber 60 partly containing a laser medium has the same cross-section shape along the direction of laser emission (i.e. the optical axis) except at both ends. Optical amplification fiber 60 has a multi-core (multiple waveguides) structure composed of first waveguide 61, second waveguide 62, third waveguide 65, and outer layer 66. First waveguide 61 is an exciting waveguide with a diameter of 125 micrometers made of quartz glass transmitting pumping light. Second waveguide 62 contains quartz glass as its base material; has a D-shaped cross section; and absorbs pumping light to generate laser. Third waveguide 65 efficiently introduces pumping light from first waveguide 61 to second waveguide 62 and is filled with a filler (desirably UV hardening acrylic adhesive) with its refractive index adjusted so as to confine the pumping light inside second waveguide 62. Outer layer 66 is made of a resin containing the refractive index conditioning filler for enhancing efficiency of confining pumping light.

The length of optical amplification fiber 60 varies depending on the concentration of ytterbium as a laser medium contained in core 63, the absorption coefficient of pumping light (a wavelength of 915 nanometers) determined by such as the cross-section shapes of first waveguide 61, second waveguide 62, and third waveguide 65, and other factors. The length is usually approximately 20 meters.

Second waveguide 62, containing ytterbium as a laser medium inside thereof, is composed of core 63 with a diameter of 30 micrometers transmitting multimode laser; and clad 64 with a representative diameter of 125 micrometers containing quartz glass as its base material confining laser generated by excitation. Assumption is made that the refractive index of first waveguide 61 is n1; the refractive index of clad 64 of second waveguide 62 is n2; the refractive index of core 63 is n3; the refractive index of third waveguide 65 is n4; and the refractive index of outer layer 66 is n5, then configuration is made so as to satisfy n5<n1<n4<n2<n3 for light with an excitation wavelength of 915 nanometers.

At both ends of optical amplification fiber 60, first waveguide 61 and second waveguide 62 are exposed from third waveguide 65. One end of optical amplification fiber 60 close to semiconductor laser 10 is a reflection end from which laser is not extracted as optical output; the other end is an emission end from which laser is extracted as optical output.

The most part of optical amplification fiber 60, except its both ends, desirably part one meter or more distant from each end face, is wound at a desired, inconstant curvature radius. The curvature radius gradually decreases from the reflection end toward the emission end, and the part is spirally wound. A desirable minimum curvature radius is such that only single-mode laser can be transmitted. The part spirally wound is mostly on the same plane. At least most of the part spirally wound is placed through a heat dissipating agent, desirably with heat transferring silicone putty, in the same way as in the first embodiment. Hence, the part spirally wound is efficiently cooled.

At both ends of optical amplification fiber 60, first waveguide 61 and second waveguide 62 are exposed from third waveguide 65. First waveguide 61 at the reflection end has fiber 76 (desirably germanium-doped quartz fiber) including Bragg grating 71 that transmits pumping light with a wavelength of 915 nanometers and reflects laser with a wavelength of 1,085 nanometers, spliced thereto. Second waveguide 62 at the reflection end has fiber 77 (desirably germanium-doped quartz fiber) including Bragg grating 72 that reflects pumping light with a wavelength of 915 nanometers and reflects laser with a wavelength of 1,085 nanometers, spliced thereto. First waveguide 61 at the emission end has fiber 78 (desirably germanium-doped quartz fiber) including Bragg grating 73 that transmits pumping light with a wavelength of 915 nanometers and reflects laser with a wavelength of 1,085 nanometers, spliced thereto. Second waveguide 62 at the emission end has fiber 79 (desirably germanium-doped quartz fiber) including Bragg grating 74 that reflects pumping light with a wavelength of 915 nanometers and transmits part of light with a wavelength of 1,085 nanometers, spliced thereto.

Thus, this embodiment includes first and second waveguides 61 and 62 exposed from the end of the third waveguide. The waveguides have fiber 76, 77, 78, and 79 spliced thereto including fiber Bragg gratings for reflecting and transmitting laser, with given reflection factor and transmittance for light with a given wavelength. Respective reflection and transmission factors are determined by such as the gain of optical amplification fiber 60. The reflection factors are desirably 95% or higher.

A description is made of operation of fiber laser apparatus configured as above. First, semiconductor laser 10 as an excitation source is driven by a typical power supply, cooler, and controller (all not shown) to emit laser with a wavelength of 915 nanometers as light for exciting ytterbium through semiconductor laser transmission fiber 15.

Semiconductor laser transmission fiber 15 is spliced to first waveguide 61 of optical amplification fiber 60 through fiber 76 including fiber Bragg grating 71. Laser emitted is introduced to first waveguide 61 of optical amplification fiber 60. This laser is light for exciting ytterbium.

In comparison of refractive index n1 of first waveguide 61 to refractive index n4 of third waveguide 65 enclosing first waveguide 61, n1<n4 is satisfied, and thus as pumping light propagates through first waveguide 61, the light leaks out into third waveguide 65. The pumping light leaks out into third waveguide 65 while propagating through first waveguide 61 at a ratio determined by the curvature radius of first waveguide 61 and third waveguide 65. In other words, the mode of light transmittable by first waveguide 61 is determined by the curvature radius of optical amplification fiber 60. Light in an untransmittable mode leaks out into third waveguide 65.

This embodiment has a structure such that the curvature radius decreases from the reflection end toward the emission end. As a result, light ceases to propagate through first waveguide 61 from the reflection end toward the emission end, sequentially from a higher-order mode to a lower, to leak out into third waveguide 65.

Light in a higher-order mode cannot be transmitted through first waveguide 61 as the curvature radius decreases, and leaks out into third waveguide 65. That is to say, changing the curvature radius from the reflection end toward the emission end prevents high-power pumping light from passing through a small area of a filler filling third waveguide 65 at one time, but allows high-power pumping light to pass through a wide area over the entire lengthwise direction of optical amplification fiber 60. Accordingly, the volume of the filler through which pumping light passes increases, which decreases the output power of pumping light passing through a unit volume of the filler.

In comparison of refractive index n5 of outer layer 66 to refractive index n4 of third waveguide 65, n5<n4 is satisfied, and thus pumping light that has leaked out into third waveguide 65 is confined into third waveguide 65 and propagates through the inside of third waveguide 65 while multiply reflecting. In comparison of refractive index n2 of clad 64 of second waveguide 62 to refractive index n4 of third waveguide 65, n2>n4 is satisfied, and thus part of pumping light propagating through the inside of third waveguide 65 enters clad 64; is confined into second waveguide 62; and propagates through the inside of second waveguide 62 while multiply reflecting.

In comparison of refractive index n3 of core 63 to refractive index n2 of clad 64 of second waveguide 62, n3>n2 is satisfied, and thus part of pumping light propagating through the inside of second waveguide 62 enters core 63. On this occasion, the cross section of clad 64 of second waveguide 62 is D-shaped, and thus all the light is absorbed into core 63 while repeating multiplex reflection in clad 64 to excite ytterbium as a laser medium.

Specifically, pumping light that has entered one end of first waveguide 61 propagates through the inside of second waveguide 62 while attenuating through the absorption process, and is absorbed into ytterbium in core 23 in due time to excite ytterbium. Light generated by the excitation undergoes multiplex amplification feedback and mode selection by wrapping around of optical amplification fiber 60. This generates single-mode laser with a wavelength of 1,085 nanometers and is emitted from core 63.

As described above, the configuration of this embodiment includes optical amplification fiber 60 containing first waveguide 61 and for transmitting pumping light, and second waveguide 62 including core 63 for transmitting multimode light so that pumping light can enter core 63. Optical amplification fiber 60 is spirally wound, which allows providing fiber laser apparatus that emits laser with high power and high beam quality.

Fourth Exemplary Embodiment

Figure 4A:
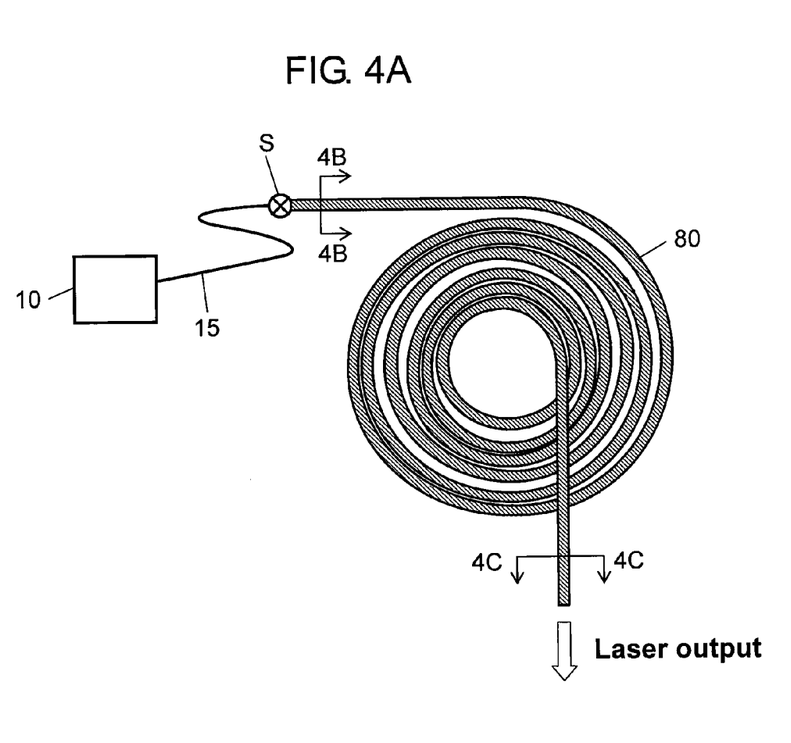
FIG. 4A is a block diagram of fiber laser apparatus according to the fourth exemplary embodiment of the present invention.
Figure 4B:
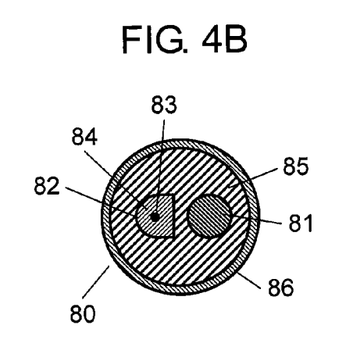
FIG. 4B is a sectional view taken along the line 4B-4B in FIG. 4A.
Figure 4C:
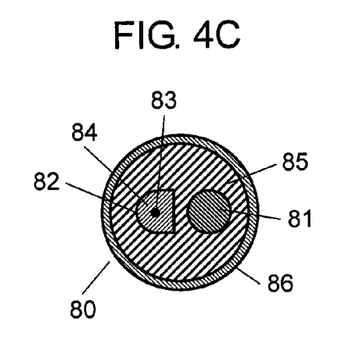
FIG. 4C is a sectional view taken along the line 4C-4C in FIG. 4A.

In this embodiment, a component same as that in the first embodiment is given the same reference mark to omit its detailed description. FIG. 4A is a block diagram of fiber laser apparatus according to the embodiment. FIG. 4B is a sectional view taken along the line 4B-4B in FIG. 4A. FIG. 4C is a sectional view taken along the line 4C-4C in FIG. 4A.

In this embodiment, optical amplification fiber 80 partly containing a laser medium has the same cross-section shape along the direction of laser emission (i.e. the optical axis) except at both ends. Optical amplification fiber 80 has a multi-core (multiple waveguides) structure composed of first waveguide 81, second waveguide 82, third waveguide 85, and outer layer 86.

First waveguide 81 is an exciting waveguide with a diameter of 125 micrometers made of quartz glass transmitting pumping light. Second waveguide 82 contains quartz glass as its base material; has a D-shaped cross section; and absorbs pumping light to generate laser. Third waveguide 85 efficiently introduces pumping light from first waveguide 81 to second waveguide 82 and is filled with a filler (desirably UV hardening acrylic adhesive) with its refractive index adjusted so as to confine the pumping light inside second waveguide 82. Outer layer 86 is a surface layer made of a resin containing the refractive index conditioning filler for enhancing efficiency of confining pumping light.

Second waveguide 82, containing ytterbium as a laser medium inside thereof, is composed of core 83 with a diameter of 30 micrometers transmitting multimode laser; and clad 84 with a representative diameter of 125 micrometers containing quartz glass as its base material confining laser generated by excitation. Assumption is made that the refractive index of first waveguide 81 is n1; the refractive index of clad 84 of second waveguide 82 is n2; the refractive index of core 83 is n3; the refractive index of third waveguide 85 is n4; the refractive index of and outer layer 86 is n5, then configuration is made so as to satisfy n5<n1<n4<n2<n3 for light with an excitation wavelength of 915 nanometers. The length of optical amplification fiber 80 varies depending on the concentration of ytterbium as a laser medium contained in core 83, the absorption coefficient of pumping light (a wavelength of 915 nanometers) determined by such as the cross-section shapes of first waveguide 81, second waveguide 82, and third waveguide 85, and other factors. The length is usually approximately 20 meters.

One end of optical amplification fiber 80 is a reflection end from which laser is not extracted as optical output; the other end is an emission end from which laser is extracted as optical output. The most part of optical amplification fiber 80, except its both ends, desirably part one meter or more distant from each end face, is wound at a desired, inconstant curvature radius. The curvature radius gradually decreases from the reflection end toward the emission end, and the part is spirally wound. A desirable minimum curvature radius is such that only single-mode laser can be transmitted.

The part spirally wound is mostly on the same plane. At least most of the part spirally wound is placed through a heat dissipating agent, desirably through heat transferring silicone putty, in the same way as in the first embodiment. Hence, the part spirally wound is efficiently cooled.

At both ends of optical amplification fiber 80, first waveguide 81 and second waveguide 82 are not exposed from third waveguide 85. First waveguide 81 at the reflection end is spliced to semiconductor laser transmission fiber 15 by fusion bonding. This structure transmits pumping light with a wavelength of 915 nanometers through the inside of optical amplification fiber 80.

Although not illustrated, core 83 constituting second waveguide 82 at the reflection end includes a fiber Bragg grating that reflects pumping light with a wavelength of 915 nanometers and reflects laser with a wavelength of 1,085 nanometers, as described in the third embodiment. In the same way, second waveguide 82 at the emission end includes a fiber Bragg grating that reflects pumping light with a wavelength of 915 nanometers and transmits part of light with a wavelength of 1,085 nanometers. Respective reflection and transmission factors are determined by such as the length of optical amplification fiber 80. The reflection factors are desirably 95% or higher.

A description is made of operation of fiber laser apparatus configured as above. First, semiconductor laser 10 as an excitation source is driven by a typical power supply, cooler, and controller (all not shown) to emit laser with a wavelength of 915 nanometers as light for exciting ytterbium through semiconductor laser transmission fiber 15.

Semiconductor laser transmission fiber 15 is spliced to first waveguide 81 of optical amplification fiber 80. Laser emitted is introduced to first waveguide 81 of optical amplification fiber 80. This laser is light for exciting ytterbium.

In comparison of refractive index n1 of first waveguide 81 to refractive index n4 of third waveguide 85 enclosing first waveguide 81, n1<n4 is satisfied, and thus as pumping light propagates through first waveguide 81, the light leaks out into third waveguide 85. The pumping light leaks out into third waveguide 85 while propagating through first waveguide 81 at a ratio determined by the curvature radius of first waveguide 81 and third waveguide 85. In other words, the mode of light transmittable by first waveguide 81 is determined by the curvature radius of optical amplification fiber 80. Light in an untransmittable mode leaks out into third waveguide 85.

The fourth embodiment has a structure such that the curvature radius decreases from the reflection end toward the emission end. As a result, light ceases to propagate through first waveguide 81 from the reflection end toward the emission end, sequentially from a higher-order mode to a lower, to leak out into third waveguide 85. Light in a higher-order mode cannot be transmitted through first waveguide 81 as the curvature radius decreases and leaks out into third waveguide 85.

That is to say, changing the curvature radius from the reflection end toward the emission end prevents high-power pumping light from passing through a small area of a filler filling third waveguide 85 at one time, but allows high-power pumping light to pass through a wide area over the entire lengthwise direction of optical amplification fiber 80.

In comparison of refractive index n5 of outer layer 86 to refractive index n4 of third waveguide 85, n5<n4 is satisfied, and thus pumping light that has leaked out into third waveguide 85 is confined into third waveguide 85 and propagates through the inside of third waveguide 85 while multiply reflecting.

In comparison of refractive index n2 of clad 84 of second waveguide 82 to refractive index n4 of third waveguide 85, n2>n4 is satisfied, and thus part of pumping light propagating through the inside of third waveguide 85 enters clad 84; is confined into second waveguide 82; and propagates through the inside of second waveguide 82 while multiply reflecting.

In comparison of refractive index n3 of core 83 to refractive index n2 of clad 84 of second waveguide 82, n3>n2 is satisfied, and thus part of pumping light propagating through the inside of the second waveguide enters core 83.

On this occasion, the cross section of clad 84 of second waveguide 82 is D-shaped, and thus all the light is absorbed into core 83 while repeating multiplex reflection in clad 84 to excite ytterbium as a laser medium.

An optical resonator is constituted of a fiber Bragg grating (not illustrated) provided at the reflection end of core 83, that reflects pumping light with a wavelength of 915 nanometers and reflects laser with a wavelength of 1,085 nanometers; and a fiber Bragg grating (not illustrated) provided at the emission end of core 83, that reflects pumping light with a wavelength of 915 nanometers and transmits part of light with a wavelength of 1,085 nanometers. As a result, light generated by the above-described excitation undergoes multiplex amplification feedback by the optical resonator and mode selection by wrapping around of optical amplification fiber 80. This generates single-mode laser with a wavelength of 1,085 nanometers and is emitted from core 83.

As described above, the configuration of this embodiment includes optical amplification fiber 80 containing first waveguide 81 for transmitting pumping light and second waveguide 82 including core 83 for transmitting multimode light so that pumping light can enter core 83. Optical amplification fiber 80 is spirally wound, which allows providing fiber laser apparatus that emits laser with high power and high beam quality.

Fifth Exemplary Embodiment

Figure 5A:
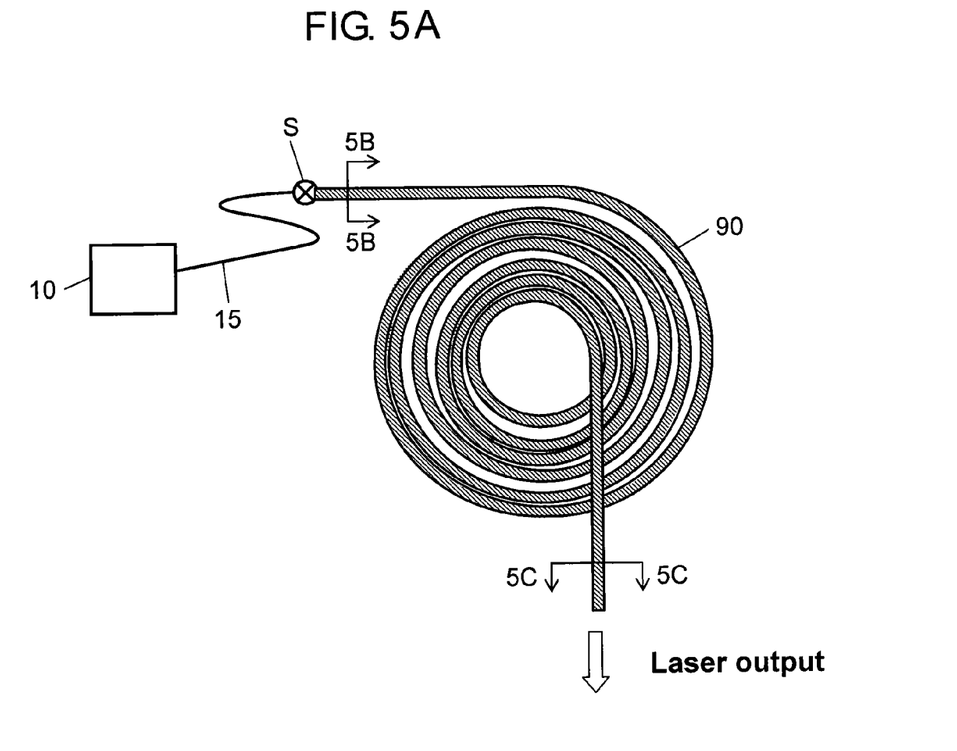
FIG. 5A is a block diagram of fiber laser apparatus according to the fifth exemplary embodiment of the present invention.
Figure 5B:
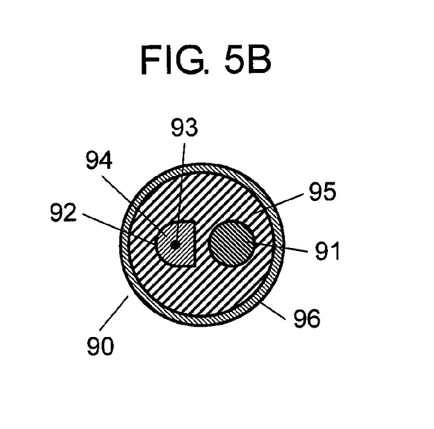
FIG. 5B is a sectional view taken along the line 5B-5B in FIG. 5A.
Figure 5C:
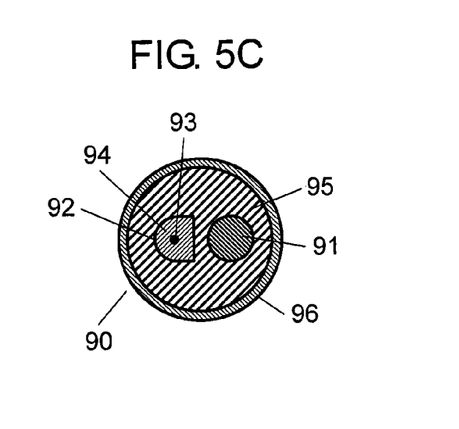
FIG. 5C is a sectional view taken along the line 5C-5C in FIG. 5A.

In this embodiment, a component the same as that in the fourth embodiment is given the same reference mark to omit its detailed description. FIG. 5A is a block diagram of fiber laser apparatus according to the embodiment. FIG. 5B is a sectional view taken along the line 5B-5B in FIG. 5A. FIG. 5C is a sectional view taken along the line 5C-5C in FIG. 5A.

In this embodiment, optical amplification fiber 90 partly containing a laser medium has the same cross-section shape along the direction of laser emission (i.e. the optical axis) except at both ends. Optical amplification fiber 90 has a multi-core (multiple waveguides) structure composed of first waveguide 91, second waveguide 92, third waveguide 95, and outer layer 96.

First waveguide 91 is an exciting waveguide with a diameter of 125 micrometers made of quartz glass transmitting pumping light. Second waveguide 92 contains quartz glass as its base material; has a D-shaped cross section; and absorbs pumping light to generate laser. Third waveguide 95 efficiently introduces pumping light from first waveguide 91 to second waveguide 92 and is filled with a filler (desirably UV hardening acrylic adhesive) with its refractive index adjusted so as to confine the pumping light inside second waveguide 92. Outer layer 96 is a surface layer made of a resin containing the refractive index conditioning filler for enhancing efficiency of confining pumping light.

Second waveguide 92, containing ytterbium as a laser medium inside thereof, is composed of core 93 with a diameter of 30 micrometers transmitting multimode laser; and clad 94 with a representative diameter of 125 micrometers containing quartz glass as its base material confining laser generated by excitation. Assumption is made that the refractive index of first waveguide 91 is n1; the refractive index of clad 94 of second waveguide 92 is n2; the refractive index of core 93 is n3; the refractive index of third waveguide 95 is n4; and the refractive index of outer layer 96 is n5, then configuration is made so as to satisfy n2<n3 for light with an excitation wavelength of 915 nanometers. One end of optical amplification fiber 90 is a reflection end from which laser is not extracted as optical output; the other end is an emission end from which laser is extracted as optical output.

The most part of optical amplification fiber 90, except its both ends, desirably part one meter or more distant from each end face, is wound at a desired, inconstant curvature radius. The curvature radius gradually decreases from the reflection end toward the emission end, and the part is spirally wound. The part spirally wound is mostly on the same plane. At least most of the part spirally wound is placed through a heat dissipating agent, in the same way as in the first embodiment. Hence, the part spirally wound is efficiently cooled.

At both ends of optical amplification fiber 90, first waveguide 91 and second waveguide 92 are not exposed from third waveguide 95. First waveguide 91 at the reflection end is spliced to semiconductor laser transmission fiber 15 by fusion bonding. This structure transmits pumping light with a wavelength of 915 nanometers through the inside of optical amplification fiber 90.

Core 93 constituting second waveguide 92 at the reflection end includes a fiber Bragg grating that reflects pumping light with a wavelength of 915 nanometers and reflects laser with a wavelength of 1,085 nanometers. In the same way, second waveguide 92 at the emission end includes a fiber Bragg grating that reflects pumping light with a wavelength of 915 nanometers and transmits part of laser with a wavelength of 1,085 nanometers. Respective reflection and transmission factors are determined by such as the length of optical amplification fiber 90. The reflection factors are desirably 95% or higher.

A description is made of operation of fiber laser apparatus configured as above. First, semiconductor laser 10 as an excitation source is driven by a typical power supply, cooler, and controller (all not shown) to emit laser with a wavelength of 915 nanometers as light for exciting ytterbium through semiconductor laser transmission fiber 15.

Semiconductor laser transmission fiber 15 is spliced to first waveguide 91 of optical amplification fiber 90. Laser emitted is introduced to first waveguide 91 of optical amplification fiber 90. This laser is light for exciting ytterbium. The pumping light, as it propagates through first waveguide 91, leaks out into third waveguide 95 as the curvature radius decreases, sequentially from a higher-order mode to a lower. The pumping light leaks out into third waveguide 95 while propagating through first waveguide 91 at a ratio depending on the curvature radius of optical amplification fiber 90.

In other words, selecting the curvature radius of optical amplification fiber 90 as appropriate determines the mode of light transmittable by first waveguide 91 regardless of magnitude correlation between refractive index n1 of first waveguide 91 and refractive index n4 of third waveguide 95. Light in an untransmittable mode leaks out into third waveguide 95.

This embodiment has a structure such that the curvature radius decreases from the reflection end toward the emission end. As a result, light ceases to propagate through first waveguide 91 from the reflection end toward the emission end, sequentially from a higher-order mode to a lower, to leak out into third waveguide 95. Light in a higher-order mode cannot be transmitted through first waveguide 91 as the curvature radius decreases and leaks out into third waveguide 95.

That is to say, changing the curvature radius from the reflection end toward the emission end prevents pumping light from passing through a small area of a filler filling third waveguide 95 at one time, but allows high-power pumping light to pass through a wide area over the entire lengthwise direction of optical amplification fiber 90.

The light that has leaked out into third waveguide 95 propagates while being confined by outer layer 96 having a refractive index higher than that of the ambient environment (desirably air). If selecting the curvature radius of optical amplification fiber 90 as appropriate in the same way as above, part of the pumping light enters clad 94; and further part of it is absorbed in core 93 to excite ytterbium as a laser medium.

An optical resonator is constituted of a fiber Bragg grating (not illustrated) provided at the reflection end of core 93, that reflects pumping light with a wavelength of 915 nanometers and reflects laser with a wavelength of 1,085 nanometers; and a fiber Bragg grating (not illustrated) provided at the emission end of core 93, that reflects pumping light with a wavelength of 915 nanometers and transmits part of laser with a wavelength of 1,085 nanometers. As a result, light generated by the above-described excitation undergoes multiplex amplification feedback by the optical resonator and mode selection by wrapping around of optical amplification fiber 90. The light becomes single-mode laser with a wavelength of 1,085 nanometers and is emitted from core 93.

As described above, the configuration of this embodiment includes optical amplification fiber 90 containing first waveguide 91 for transmitting pumping light and second waveguide 92 including core 93 for transmitting multimode light so that pumping light can enter core 93. Optical amplification fiber 90 is spirally wound, which allows providing fiber laser apparatus that emits laser with high power and high beam quality.

Sixth Exemplary Embodiment

Figure 6:
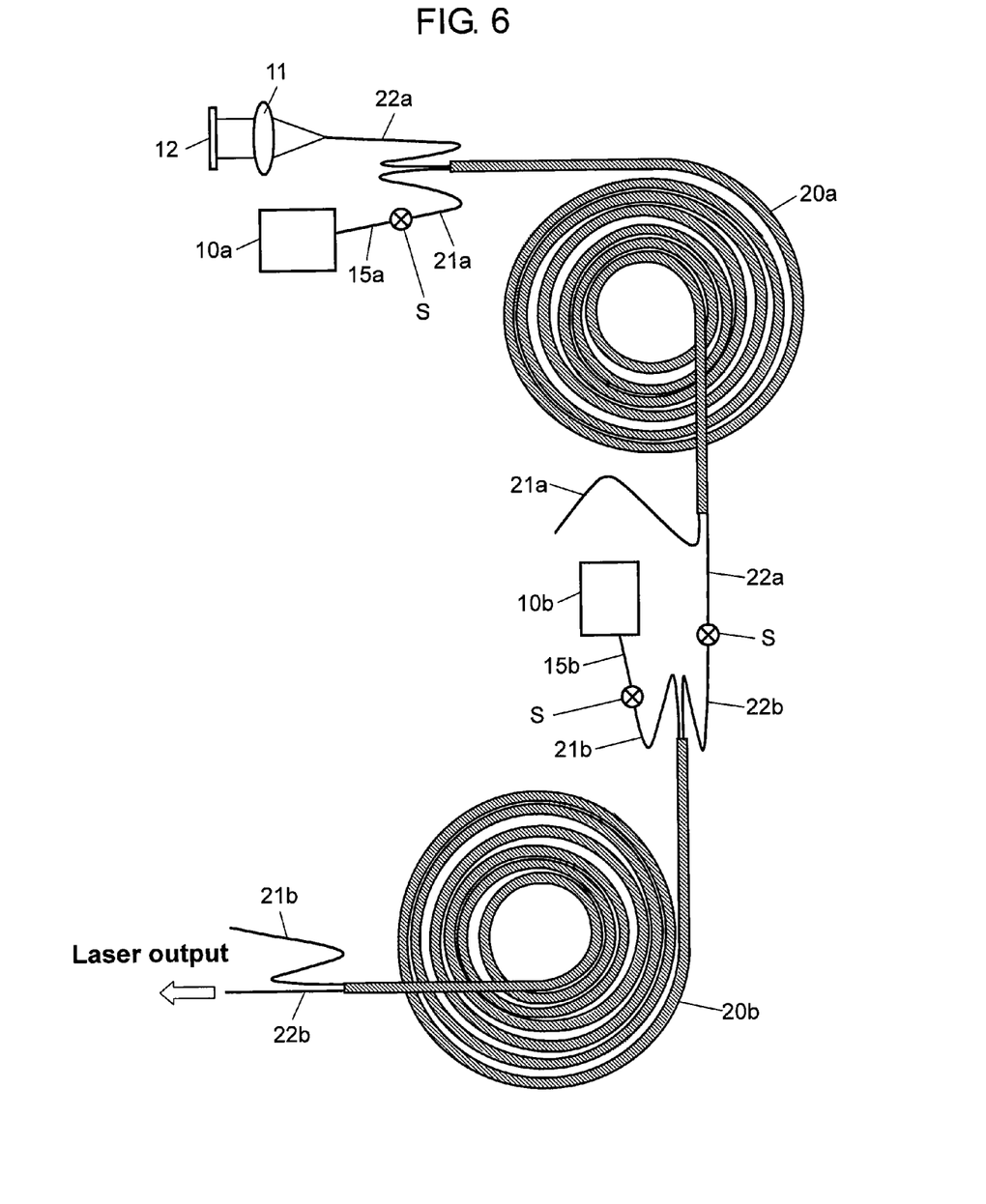
FIG. 6 is a block diagram of fiber laser apparatus according to the sixth exemplary embodiment of the present invention.

In this embodiment, a component the same as that in the first embodiment is given the same reference mark to omit its detailed description. FIG. 6 is a block diagram of fiber laser apparatus according to the embodiment. This embodiment is different from the first embodiment in that second waveguides 22a, 22b are spliced that are exposed from the ends of two optical amplification fiber 20a, 20b wound while the curvature radius is being changed, and further in that two optical amplification fiber 20a, 20b have semiconductor lasers 10a, 10b as pumping light sources at one end of optical amplification fiber 20a, 20b, respectively. In other words, this embodiment performs optical amplification using two stages of optical amplification fiber 20 of the first embodiment.

In FIG. 6, semiconductor lasers 10a, 10b, and semiconductor laser transmission fiber 15a, 15b have functions same as those of semiconductor laser 10 and semiconductor laser transmission fiber 15 in the first embodiment.

A description is made of fiber laser apparatus configured as above. Ytterbium is excited by pumping light at each stage through the same process as that in the first embodiment. Light generated by ytterbium excitation undergoes multiplex amplification feedback by lens 11 and final-stage mirror 12 provided at the end face of second waveguide 22a in optical amplification fiber 20a at the first stage; and by Fresnel reflection due to the cleaved end face of second waveguide 22b in optical amplification fiber 20b at the second stage. This generates laser with a wavelength of 1,085 nanometers, which is emitted from the other end of second waveguide 22b of optical amplification fiber 20b at the second stage.

As described above, with a two-stage structure by splicing second waveguides 22a, 22b of two optical amplification fiber 20a, 20b, respectively, this embodiment provides fiber laser apparatus that emits high-power laser. In this embodiment, a two-stage structure (optical amplification fiber 20a, 20b) is used; however, increasing the number of stages provides laser with higher power.

In the above-described embodiments first through sixth, optical separation is made to avoid optical coupling between each optical amplification fiber (optical amplification fiber 20, 20a, 20b, 60, 80, 90) wound while each curvature radius is being changed. For instance, the outermost circumference of optical amplification fiber is coated or fixed with a material with a low refractive index. As another structure, a partition plate is placed that is made of a material optically invisible or having a high attenuation rate, between each optical amplification fiber. As yet another structure, optical amplification fiber is placed and fixed in a container with grooves and walls formed therein, made of a material optically invisible or having a high attenuation rate. These structures enable optical amplification fiber to be set in place and retain the position.

INDUSTRIAL APPLICABILITY

Fiber laser apparatus and an optical amplification method of the present invention achieve a small size and high power, and thus useful for an application such as a laser processing machine.

REFERENCE MARKS IN THE DRAWINGS 10, 10a, 10b Semiconductor laser
11 Lens
12 Final-stage mirror
15, 15a, 15b Semiconductor laser transmission fiber
20, 60, 80, 90 Optical amplification fiber
21, 21a, 21b, 61, 81, 91 First waveguide
22, 22a, 22b, 62, 82, 92 Second waveguide
23, 63, 83, 93 Core
24, 64, 84, 94 Clad
25, 65, 85, 95 Third waveguide
26, 66, 86, 96 Outer layer
31 Part spirally wound
32 Heat dissipating agent
33 Cooling board
34 Heat dissipating putty
40 Cooling cone
71, 72, 73, 74 Fiber Bragg grating
76, 77, 78, 79 Fiber

The invention claimed is:

1. Fiber laser equipment comprising optical amplification fiber with a multi-core structure including:
a first waveguide that pumping light enters and that transmits the pumping light;
a second waveguide including a core containing a laser medium and for generating laser, and a clad for transmitting the pumping light; and
a cladding containing the first and second waveguides,
wherein the first waveguide and the second waveguide are disposed side by side coaxially,
wherein the optical amplification fiber is wound while a curvature radius thereof is being gradually decreased along a direction in which pumping light is transmitted through an inside of the first waveguide, and
wherein the second waveguide is exposed from the cladding at one end of the optical amplification fiber.

2. The fiber laser equipment of claim 1, wherein the optical amplification fiber is spirally wound.

3. The fiber laser equipment of claim 1, wherein the optical amplification fiber is wound along a cone shape.

4. The fiber laser equipment of claim 1, wherein the optical amplification fiber is unified with a heat dissipating agent.

5. The fiber laser equipment of claim 1, wherein the first waveguide is exposed from the cladding at the one end of the optical amplification fiber, and
wherein the one end of the optical amplification fiber is at a side of a larger winding curvature.

6. The fiber laser equipment of claim 1, wherein fiber having a fiber Bragg grating is spliced to the second waveguide exposed.

7. The fiber laser equipment of claim 5, wherein fiber having a fiber Bragg grating is spliced to the first waveguide exposed.

8. The fiber laser equipment of claim 1 wherein other fiber laser equipment is connected to the second waveguide exposed.

9. The fiber laser equipment of claim 1, wherein n1<n4<n2<n3 is satisfied, where n1 is a refractive index of the first waveguide, n2 is a refractive index of a clad of the second waveguide, n3 is a refractive index of a core of the second waveguide, and n4 is a refractive index of the cladding.

10. An optical amplification method using optical amplification fiber with a multi-core structure including:
a first waveguide that pumping light enters and that transmits the pumping light;
a second waveguide including a core containing a laser medium and for generating laser, and a clad for transmitting the pumping light; and
a cladding containing the first and second waveguides,
wherein the first waveguide and the second waveguide are disposed side by side coaxially,
wherein the optical amplification fiber is wound while a curvature radius thereof is being gradually decreased along a direction in which pumping light is transmitted through an inside of the first waveguide, and
wherein the second waveguide is exposed from the cladding at one end of the optical amplification fiber.

11. The optical amplification method of claim 10, wherein the first waveguide is exposed from the cladding at the one end of the optical amplification fiber, and
wherein the one end of the optical amplification fiber is at a side of a larger winding curvature.

12. The optical amplification method of claim 10, wherein fiber having a fiber Bragg grating is spliced to the second waveguide exposed.

13. The optical amplification method of claim 11, wherein fiber having a fiber Bragg grating is spliced to the first waveguide exposed.

14. The optical amplification method of claim 10 wherein laser generated by other fiber laser equipment is optically connected to the second waveguide exposed.

15. The optical amplification method of claim 10, wherein n1<n4<n2<n3 is satisfied, where n1 is a refractive index of the first waveguide, n2 is a refractive index of a clad of the second waveguide, n3 is a refractive index of a core of the second waveguide, and n4 is a refractive index of the cladding.

16. Fiber laser equipment comprising optical amplification fiber with a multi-core structure including:
　　a first waveguide that pumping light enters and that transmits the pumping light;
　　a second waveguide including a core containing a laser medium and for generating laser, and a clad for transmitting the pumping light; and
　　a cladding containing the first and second waveguides,
wherein the first waveguide and the second waveguide are disposed side by side coaxially, and
wherein the optical amplification fiber is wound while a curvature radius thereof is being decreased, in the whole wound region, along a direction in which pumping light is transmitted through an inside of the first waveguide.

17. The fiber laser equipment of claim 16, wherein the optical amplification fiber is spirally wound.

18. The fiber laser equipment of claim 16, wherein the optical amplification fiber is wound along a cone shape.

19. The fiber laser equipment of claim 16, wherein the optical amplification fiber is unified with a heat dissipating agent.

20. The fiber laser equipment of claim 1, wherein n1<n4<n2<n3 is satisfied, where n1 is a refractive index of the first waveguide, n2 is a refractive index of a clad of the second waveguide, n3 is a refractive index of a core of the second waveguide, and n4 is a refractive index of the cladding.

\* \* \* \* \*